May 11, 1926.
S. H. PLUM, 2D., ET AL
1,584,468
AUTOMATIC FEEDER FOR PLATEN PRESSES
Filed Feb. 11, 1925    7 Sheets-Sheet 4
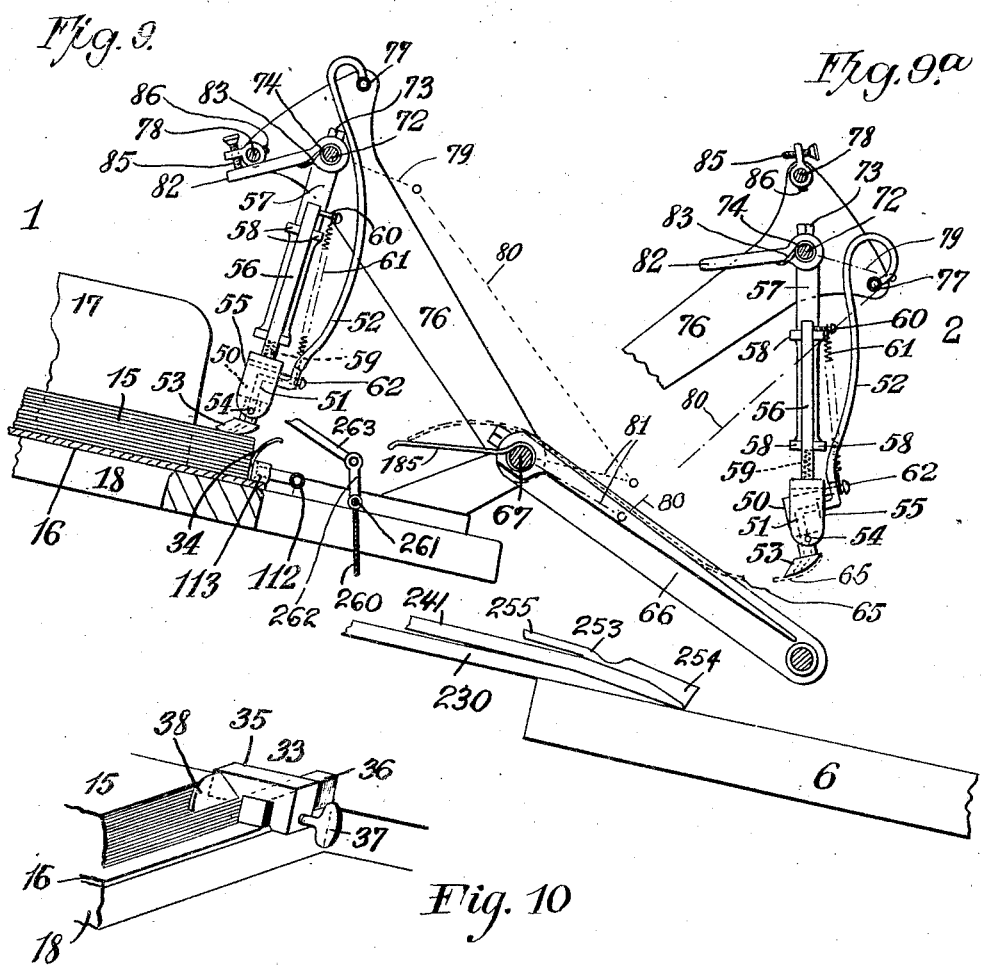
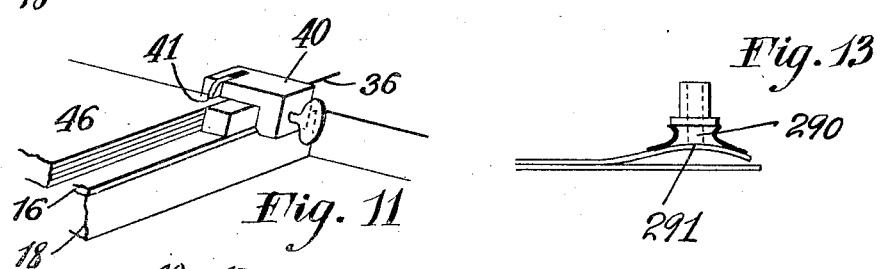
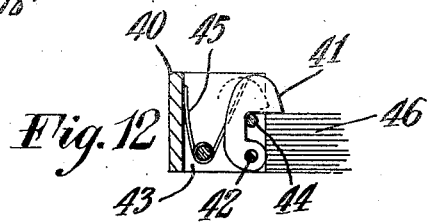

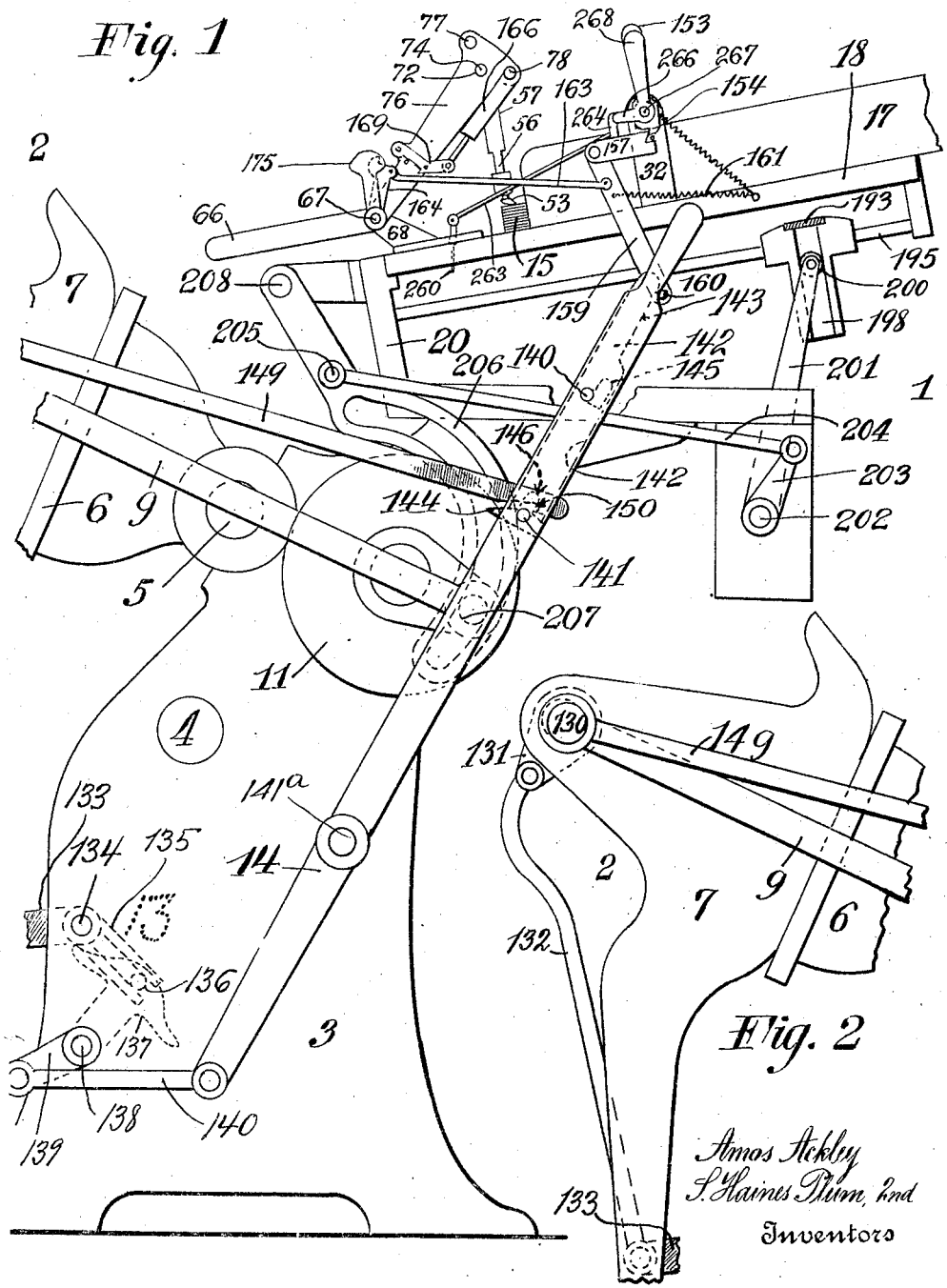

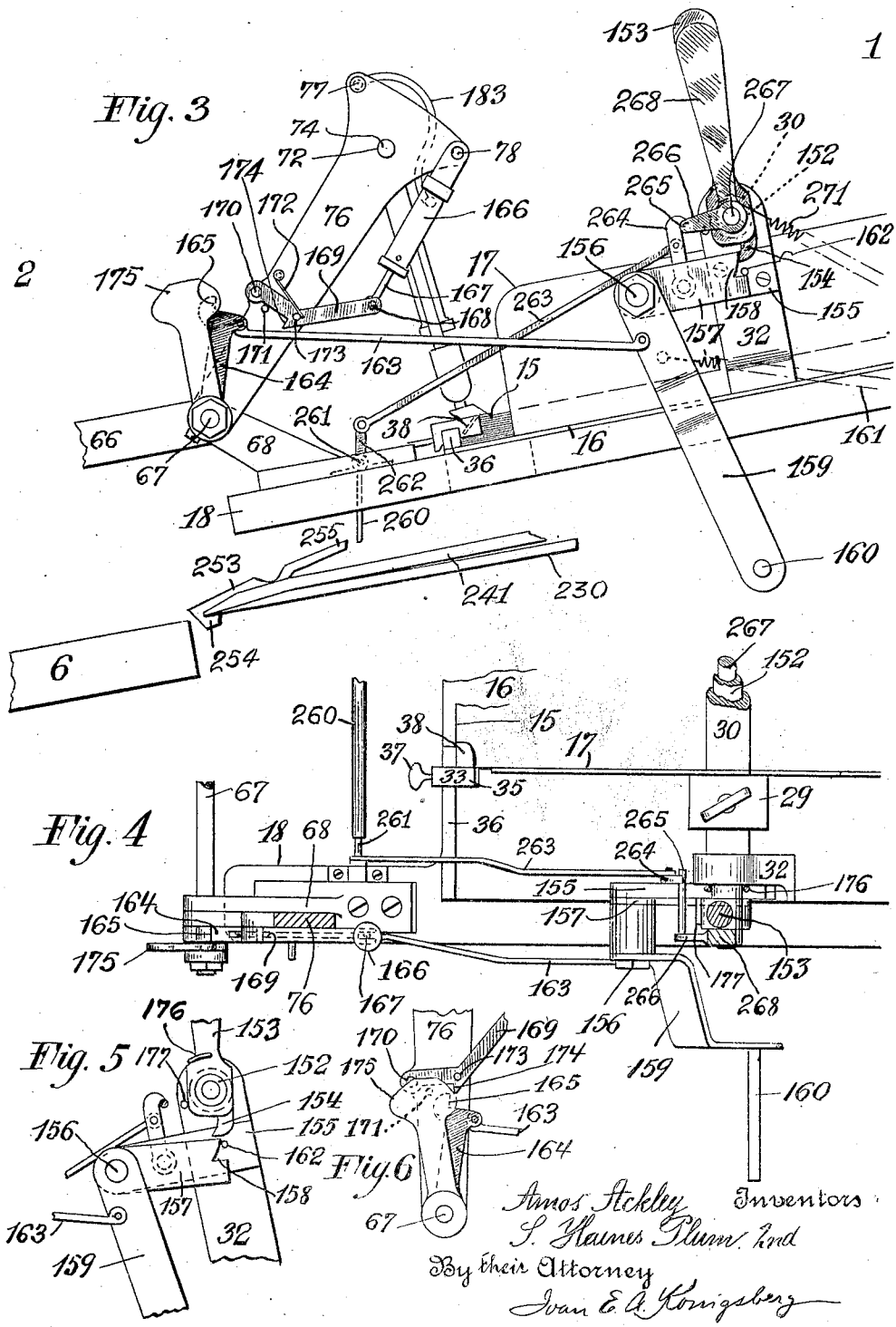

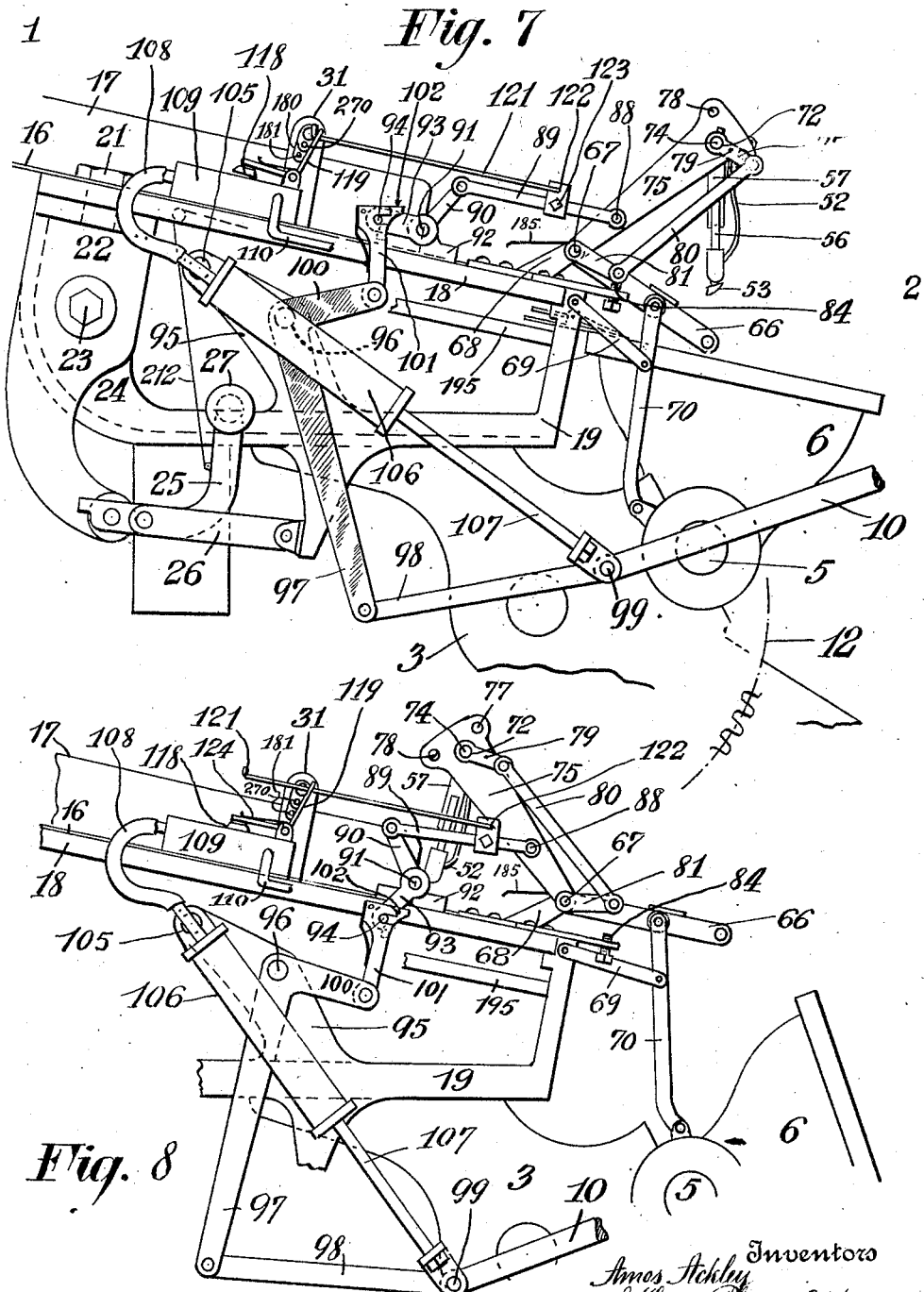

May 11, 1926.

S. H. PLUM, 2D., ET AL 1,584,468

AUTOMATIC FEEDER FOR PLATEN PRESSES

Filed Feb. 11, 1925    7 Sheets-Sheet 5

Amos Ackley
S. Haines Plum, 2nd
Inventors

By their Attorney
Ivan E. A. Konigsberg

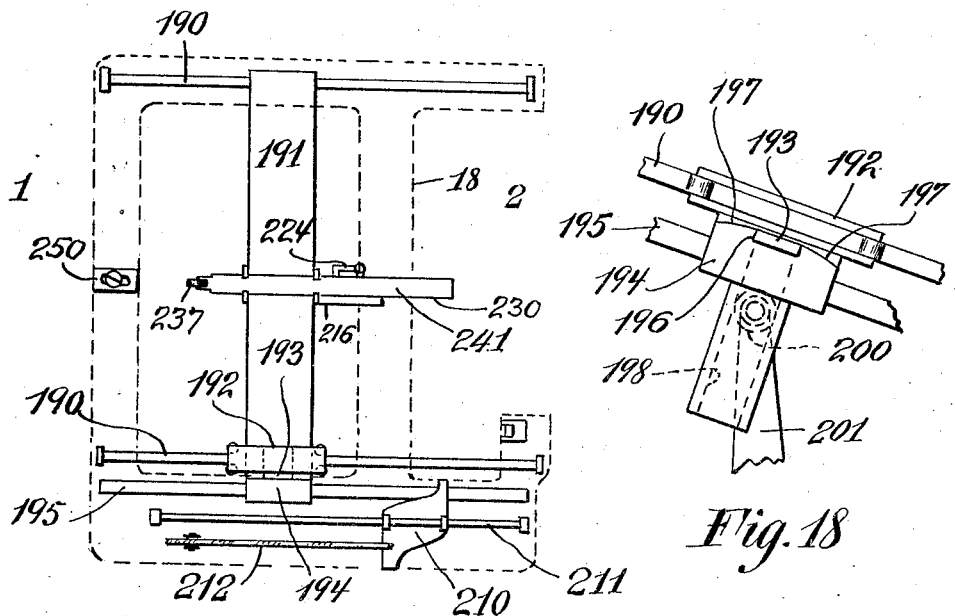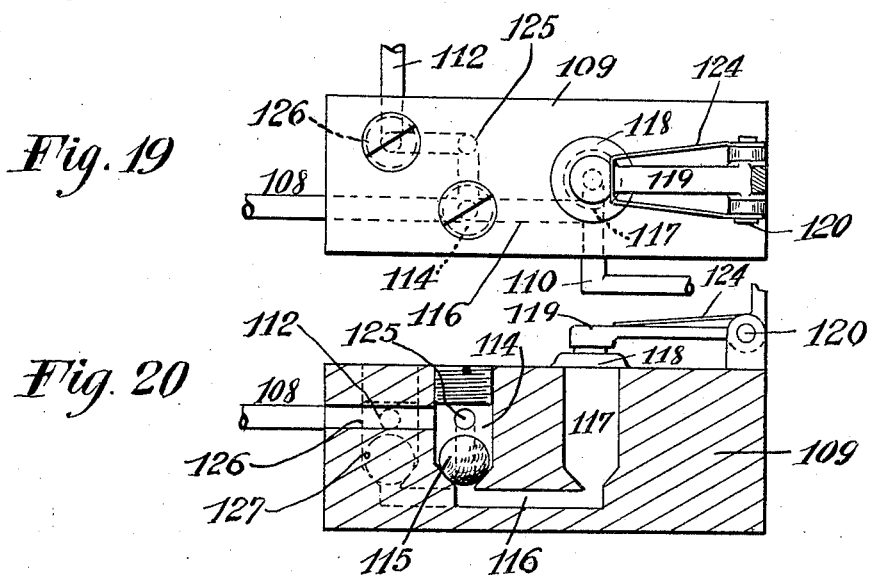

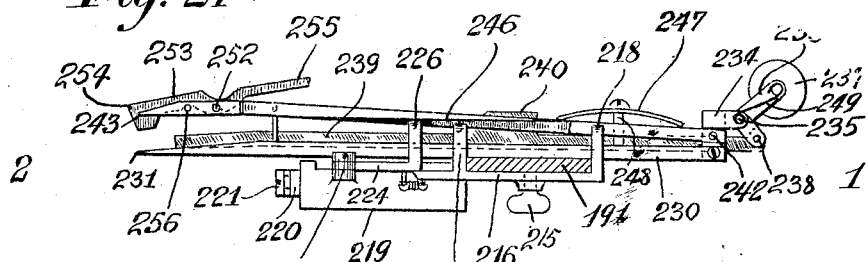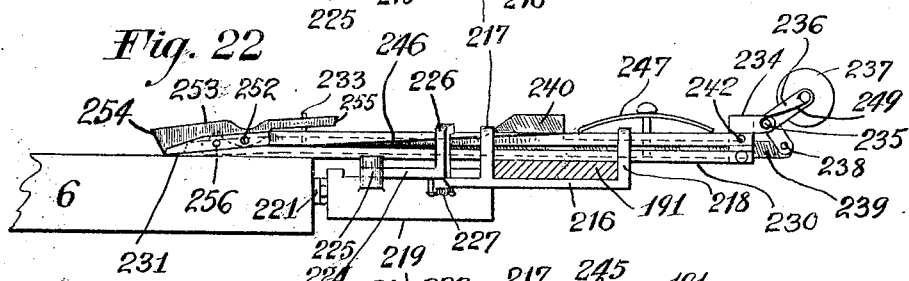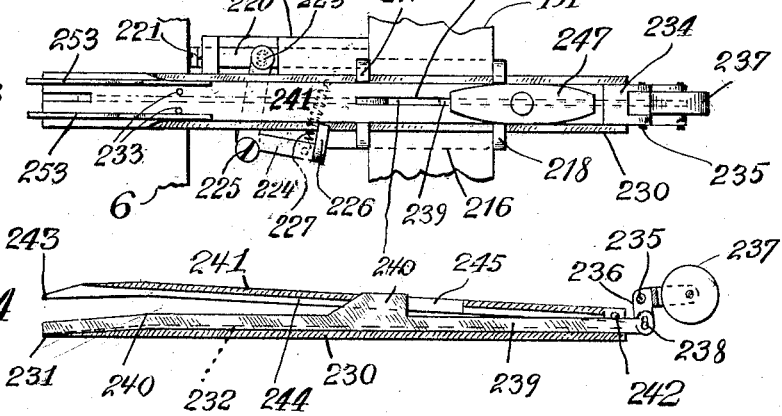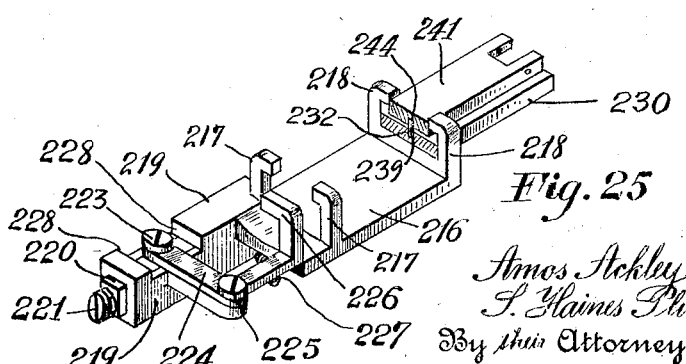

Patented May 11, 1926.

1,584,468

UNITED STATES PATENT OFFICE.

S. HAINES PLUM, 2D, OF MADISON, AND AMOS ACKLEY, OF CAMDEN, NEW JERSEY, ASSIGNORS TO AMERICAN TYPE FOUNDERS COMPANY, A CORPORATION OF NEW JERSEY.

AUTOMATIC FEEDER FOR PLATEN PRESSES.

Application filed February 11, 1925. Serial No. 8,441.

This invention relates to automatic printing machinery, and has particular reference to an automatic feeding mechanism for job platen presses of the type of the well known Chandler & Price job press, and this invention has for its objects to provide a generally improved automatic feeder, including improvements in the paper separating and conveying means, the gripping mechanism, the tripping mechanism as well as improvements generally in the arrangements, construction and operation of the several said sub mechanisms or devices, which combined constitute an automatic feeder for a platen or job press.

In some respects this invention refers particularly to certain improvements in the mechanisms named upon similarly constituted and arranged mechanisms disclosed in the U. S. Patent Number 1,476,829, dated December 11th, 1923, to L. E. Morrison, to which reference will be made hereinafter. In certain other respects, the invention herein disclosed aims to materially improve some of the mechanisms disclosed in said patent, and still further, this invention has for its objects, among others, to provide entirely new devices to be used in connection and in cooperation with some of the said patented devices.

On the other hand, while reference has thus been made and will be made to the said patent, nevertheless, it should be clearly understood that such reference is by way of example and illustration, and that this invention is not intended to be in any way limited thereby, because many of the features hereinafter set forth may be used to advantage in connection with other types of job or platen presses, and with other types of feeders.

Accordingly, this invention comprises such features, arrangements and combination of parts as are hereinafter set forth, while reference is had to the accompanying drawings in which—

Fig. 1 is a side view of a platen press equipped with an automatic feeding mechanism embodying the invention, with parts omitted and parts broken away.

Fig. 2 is a fagmentary view of a portion of the press which has been omitted in Figure 1.

Fig. 3 is a detailed side view of parts of the tripping mechanism shown in Figure 1.

Fig. 4 is a plan view of Figure 3.

Figs. 5 and 6 are detail views of parts shown in Figure 3.

Fig. 7 is a side view of the feeding mechanism and its operating parts looking at the side of the press opposite to the side shown in Figure 1.

Fig. 8 is a view similar to Figure 7 but shows the parts in other positions.

Fig. 9 is an enlarged detail view of the paper separating and conveying means.

Fig. 9$^a$ is a view of certain parts shown in Figure 9 but illustrated in a different position.

Figs. 10, 11, 12 and 13 are detail views of parts and mechanisms incidental to the separating means aforesaid.

Figure 14:
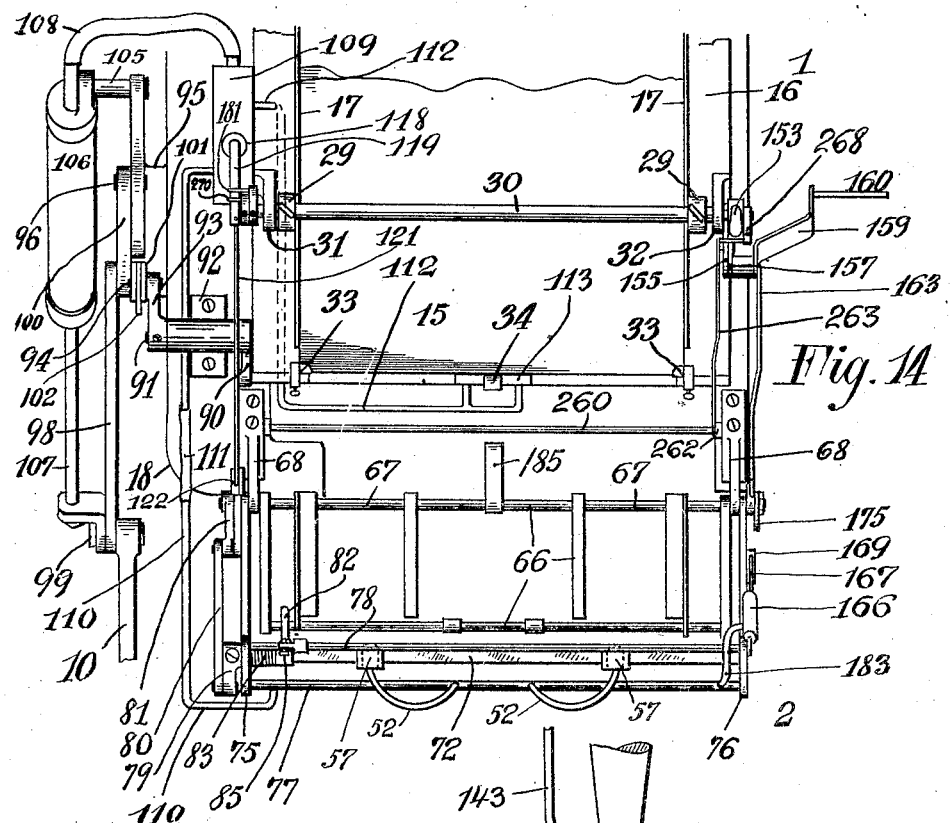

Fig. 14 is a plan view of the improved feeder with parts omitted and broken away.

Figure 15:
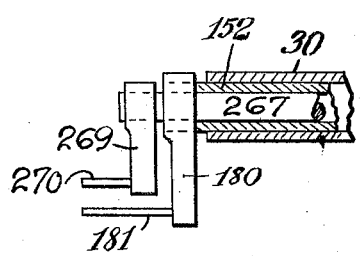

Fig. 15 is a detail view of parts shown in Figure 14.

Figure 16:
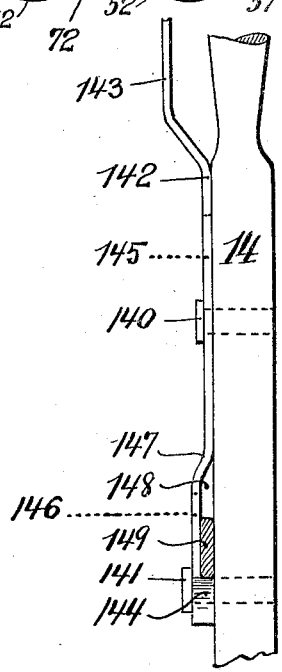

Fig. 16 is a detail view of parts of the tripping mechanism.

Figs. 17 and 18 are detail views of parts of the gripping means.

Figs. 19 and 20 are plan and sectional views of the valves for controlling the suction devices for picking up the paper.

Fig. 21 is a side view of an improved delivery gripper in open position.

Fig. 22 is a similar view showing the gripper closed.

Fig. 23 is a plan view of Figure 22.

Fig. 24 is a detail view of the gripper jaws.

Fig. 25 is a perspective view of the gripper bracket.

Referring to the several views, the front of the press is marked by the numeral 1 and the rear of the press by the numeral 2 for the purpose of locating the several parts and mechanisms. The front of the press is where the operator usually stands when feeding the press, while the form member is located to the rear.

The press itself is illustrated only in outline as it is a well known machine in the art. The frame of the press is designated 3, the driving shaft 4. 5 is the platen pivot or rock shaft, 6 the platen and 7 the form member. 9 and 10 are the usual connecting rods, 11 the platen locking cam. The numeral 12, Figure 7, is the big driven gear on the press. 13 is the tripping means and 14 the tripping lever. All of the aforesaid parts, their construction and operation are well known in the art and require no further description or illustration.

The paper 15 to be printed is placed within a paper box consisting of a bottom 16 and two adjustable sides 17, 17. The paper box is suitably secured on the inclined feed table 18 which rests on suitable side brackets 19 and 20 secured to the press frame 3. The feed table is adapted to be raised upwards from the brackets 19 and 20 and swung to one side to permit hand feeding the press or for other purposes. In this respect this invention is similar to the one disclosed in the said Patent Number 1,476,829 and the mechanism is the same.

The feed table is pivoted vertically at one corner at 21 to a support 22, which in turn is pivoted horizontally at 23 to an upright portion 24 of the said side bracket 19. By means of interconnected levers 25 and 26, and an operating handle 27, the table may be swung upwards on the pivot 23 to raise it from the brackets, after which the table may be swung to one side on pivot 21.

The raising and swing away feature just described is identical with the same feature in the patent cited.

Referring to Figures 4 and 14 it will be seen that the paper box sides 17 are secured to collars 29 which are slidably adjustable on a tubular shaft 30 supported in fixed upright bearings 31 and 32 to fit the width of the paper. The rear, leading, edges of the paper are placed against corner stops 33, 33 (see Fig. 10) and against a curved rear stop 34.

Each corner stop consists of a bracket 35 adjustably mounted on a fixed cleat 36 by means of a wing bolt 37. The bracket has an inclined lip 38 against which the corner of the paper is placed. The inclined lips prevent the paper from sliding rearward out over the stop 34, yet the lip presents no obstruction to the separating of the top sheet from the pile because the lip occupies merely a slanting position against the edges of the paper.

In the event that heavy stock or cardboard is fed, it is desirable to provide means for stripping the succeeding or second sheet from the top sheet as the latter is being lifted from the pile, in that certain heavier sheets have a tendency to stick together.

For this purpose corner stops as shown in Figures 11 and 12 may be used. These corner stops replace the stops 33 and consist of a bracket 40 adjustably mounted on the cleat 36. A stripper 41 is pivoted at 42 in a cut out 43 in the bracket, and is held in normal position (Figure 12) against a fixed pin 44 by means of a spring 45. The stripper overlies the stock 46. When the top sheet is raised, the stripper is turned backward into the bracket against the force of the spring 45 to permit the top sheet to pass. But in raising the top sheet, it is buckled or bent slightly, but sufficiently to give it a sliding movement with respect to the second sheet. Consequently, the edge of the latter is exposed slightly, but sufficiently for the stripper to snap down thereupon and strip the second sheet from the top sheet.

The top sheet is separated from the pile and conveyed to the platen by suction nozzles. Two nozzles are employed and the description of one will suffice for both. See Figure 9.

The suction nozzle is in the form of a small casting 50 which is provided with a bore 51 which at one end communicates with a hose 52, while the other lower end is provided with a suction cup 53. The nozzle is pivoted at 54 between depending lugs 55 of a nozzle hanger 56 which is slidably carried on a nozzle support 57. The latter has guiding lugs 58 and the hanger 56 moves between said lugs. Normally the hanger and nozzle will assume the positions shown to the right or front in Figure 9. It will be observed that the hanger is in its lowermost position with respect to the support 57 because the hanger and nozzle move downward by gravity assisted by an expansion spring 59 interposed between the support and the hanger. A stop 60 at the top of the hanger limits the downward movement by abutting one of the lugs 58. A contraction spring 61 extends between the stop 60 and a screw 62 on the nozzle. The spring 61 tends to tilt the nozzle on its pivots 54 whenever free to do so.

In Figure 9 the nozzle is shown at the left on top of the paper in pick up position, and at the right in Fig. 9ª the nozzle is shown in delivery position.

By means to be described presently, the nozzles are caused to descend upon the paper in such a manner that the nozzle and its hanger slides upward on the support 57, thus compressing the spring 59 and contracting the spring 61. In this position the suction is applied and the nozzle will pick up the top sheet. Immediately, thereafter the nozzle is moved away from the pile bearing the separated top sheet.

At the moment the nozzle is lifted off the pile, the spring 59 acts to move the nozzle downward and at the same time the spring 61 tilts the nozzle, thus causing the leading edge of the separated sheet 65 to be curved upwardly to assist in separating it from the pile. The sheet is then conveyed by the nozzle to the platen, and when in proper delivery or depositing position, as to the right in Figure 9, the vacuum in the nozzle is broken and the sheet dropped on the transfer table 66 from which the sheet is run off to the platen.

The transfer table 66 is identical in construction and operation with the transfer table disclosed in the said Patent Number 1,476,829. Briefly, the table is an open frameword pivoted on a shaft 67 in brackets 68 secured to the feed table 18, see Figures 7, 8, 9 and 14. The table is raised and lowered in synchronism with the movements of the platen, Figures 7 and 8, by a system of levers 69 and 70. When the feeder is to be swung away, the transfer table is raised away from the lever 70 and may be laid in over the feed table. All this, however, is merely by way of illustrating the support for the sheet prior to its deposit on the platen. The transfer table as such forms no part of this invention except as a cooperating element.

The means for operating the suction nozzles are as follows:—The nozzle supports 57 are clamped to a shaft 72 by set screws 73. The shaft 72 is square, see Fig. 14, with cylindrical ends 74, 74 for journalling the shaft in the swinging arms 75 and 76, one on each side of the feed table. The arms are pivoted on the aforesaid shaft 67. The upper ends of the arms are connected by a tube 77 and a rod 78. The swinging arms with their said connections form an oscillating nozzle carriage for operating the nozzles as shown in Figures 7, 8 and 9. The carriage is operated as follows.

Outside the one arm 75 the shaft 72 carries an arm 79 to which is pivoted a link 80, which again is connected by a short arm 81 to the said shaft 67. The arms 75, 79, 81 and the link 80 form practically a parallelogram for properly oscillating the nozzle shaft 72 to position the nozzles accurately with respect to the paper. For this purpose the shaft 72 carries adjustably clamped thereto a nozzle stop 82, see Figure 9, with a spring 83 which tends to move the stop and shaft 72 in a clockwise direction in Figure 9, one end of the said spring acting against the stop, the other end of the spring being fast in the arm 75.

That is to say, the spring 83 tends at all times to rotate the shaft 72 upwardly and rearwardly, toward the paper, consequently the spring also acts to force the three other sides of the parallelogram downward to the right in Figure 7 until the lower end of the link 80 comes to rest upon an adjustable stop 84 secured to the feed table.

Again referring to Figure 9 the nozzle stop 82 is seen to be moved into contact with an adjustable abutment 85 adjustably carried by the aforesaid connecting rod 78 by a set screw 86.

By comparing Figures 7, 8 and 9 in view of the foregoing description, it will be seen that the nozzle carriage is moved from a picking up position over the paper to a delivery position above the transfer table and platen. That the position of the nozzles in the pick up position is determined by the position of the nozzle stop 82 against the abutment 85. That if the latter is screwed down, the nozzles will be moved further in over the platen and vice versa.

In other words, the stroke or movement of the nozzle carriage being fixed, as will be presently described, nevertheless, the positions of the nozzles independent of the said stroke may be finely and accurately determined and adjusted by the abutment 85 and the stop 84 because in the pick up position, the nozzle is moved to the left by the spring 83 until stopped at 85; and in the delivery position in Figure 7 the nozzles will continue to move to the right until link 80 hits the stop 84. To assist in understanding these elements of the invention, the arms 79 and 81 and the link 80, are shown in their respective extreme positions in dotted lines in Figure 9.

The nozzle carriage is operated as follows:—To the carriage arm 75 there is pivoted at 88, Figures 7, 8 and 14, a link 89 which is pivoted to an arm 90 fast on a short shaft or pin 91 in a fixed bearing 92. To the outer end of the shaft 91 is secured another short arm 93 having a pin 94. To the aforesaid side bracket 19 there is secured in any suitable manner an upstanding portion or bearing 95 to which there is pivoted at 96 a bell crank lever 97, which is connected by a link 98 to the stud 99 which connects the lower end of the form member connecting rod 10 to the large gear 12 on the press. To the short arm 100 of the said bell crank lever 97 there is pivoted a hook arm 101 which carries a pivoted spring latch 102 which normally locks the hook arm 101 to the lever or arm 100. It follows, therefore, that as the stud 99 rotates with the gear 12, the aforesaid levers, links and arm are actuated as shown in Figures 7 and 8 to oscillate the nozzle carriage and operate the same. It will be observed that the operating connections between the gear 12, that is the movable part of the press, and the nozzle carriage is broken when the spring latch 102 is opened, whereby to permit the elements on the feed table to move therewith as said table is raised and swung to one side, while the hook arm is merely laid back on the portion 100 of the bell crank lever 97, which then, when the feeder is swung away, is operated idly on the pivot 96.

Suction is applied to the nozzles by the folowing means. On the aforesaid bearing portion 95 there is pivoted at 105 a suction air pump 106, the piston stem 107 of which is connected to the aforesaid connecting rod stud 99. From the pump an air hose 108 leads to a valve chest 109. A pipe 110 leads from the valve chest to the hollow tube or pipe 77 on the nozzle carriage to which the nozzle hoses 52 are connected as described above. Inasmuch as the tube 77 swings with the nozzle carriage, a flexible connection as at 111, Figure 14, is interposed in the said pipe 110. Still another pipe 112, also shown in Figure 14, leads from the valve chest 109 to the sheet blowing nozzle 113 secured at the rear edges of the sheets to blow them apart for better separation.

Referring now to Figures 19 and 20 it will be seen that the valve chest 109 has three valves as follows. Beginning with the aforesaid connection 108 from the pump, a channel leads to a valve chamber 114 having a ball valve 115 which controls a second channel 116 which leads to a valve chamber 117 controlled by a valve 118 affixed to a bell crank lever 119 pivoted at 120 and which is actuated by a link 121 pivoted to the aforesaid nozzle carriage operating link 89 at 122. The pivot 122 is adjustable as by means 123, see Figure 7.

A spring 124 keeps the valve 118 normally seated. Above the said ball valve 115 and from the valve chamber 114 a third channel or bore 125 leads to a third valve chamber 126 below a ball valve 127 therein. The said third connection or pipe 112 from the valve chest communicates with the valve chamber 126 above the ball valve 127.

The operation is as follows:—The suction stroke of the pump is timed to create a vacuum in the suction nozzles when the latter are in position to pick up a sheet of paper, the air being drawn out by way of the nozzle hoses 52, hollow tube 77, pipe 110, bore 116 in the valve chest, valve chamber 114 (the ball 115 being lifted by the suction) and the hose 108 to the pump. At the same time the suction operates through bore 125 to seat the ball 127 to prevent suction from operating at the blower nozzle 113. During the suction stroke the link 121 slides idly through the bell crank valve lever 119 and the valve 118 remains closed, Fig. 8.

When the nozzles have picked up a sheet and have moved to delivery position, Fig. 7, the vacuum in the system is broken by the opening of the valve 118 by the link 121. This occurs at the beginning of the compression stroke during which the air is blown or passes from the pump through the hose 108 to valve chamber 114, seating the ball valve 115, and also through bore 125 under the ball valve 127, lifting the same and blowing the air through pipe 112 to the blower nozzle 113 to seat the same.

It will thus be seen that the operation of separating the top sheet from the pile is entirely automatic and that the valve chest regulates the air currents on both suction and compression or blower stroke of the pump. Also it will be noted that the breaking of the vacuum in the suction nozzles is done automatically and may be adjusted and accurately timed to occur at any point while the nozzles move to delivery position.

Means are provided for tripping the press when the suction nozzles fail to pick up a sheet for any reason. Referring to Figures 1 and 2 the form member 7 is connected in the usual manner to an eccentric shaft 130 by means not shown. 131 is an arm secured to the shaft and the arm 131 is connected by a link 132 to another arm 133 fast to a shaft 134. The latter carries a slotted arm 135. 136 is a pin which moves in the slot in arm 135. The pin is fast in a locking arm 137 mounted on a second shaft 138. Outside the frame the shaft 138 carries an arm 139 connected by a link 140 to the tripping lever 14 which is pivoted at 141ª. The foregoing describes the well known Chandler & Price job press tripping mechanism.

When the tripping lever 14 is moved to the left in Figure 1 by the operator, the shaft 138 is rotated anticlockwise. The shaft 134 is rotated clockwise. The link 132 is lifted and swings the arm 131 to rotate the eccentric shaft 130 to trip the form. All in a well known manner.

This invention provides automatic means for operating the tripping lever 14 to trip the press. See Figures 1 to 6 inclusive, also Figures 14 to 16. Referring first to Figures 1 and 16, the tripping lever 14 is provided with two headed pins 140 and 141 which support a trip latch 142 in the form of a thin flat piece of metal having a handle 143 at its upper end and a cam 144 at its lower end. The trip latch is held in normal inactive position as in Figure 1 by the said pin 140 which passes through an L shaped slot 145. At its lower end the trip latch has a straight slot 146 through which the lower pin 141 passes. The trip latch 142 is bent as at 147, Figure 16, to provide a pocket 148 between itself and the tripping lever 14, and within said pocket slides a trip hook lever 149 which is pivoted at 130 on the form member on the outside thereof. The lever 149 has a hook 150.

Normally the trip hook lever moves with the form member and slides idly back and forth in the said pocket 148 and is prevented from engaging the lower pin 141 because the said lever rides on the said cam 144. Means, to be hereinafter described, are provided for knocking the trip latch 142 off the upper pin 140, and the trip latch will then slide down until the upper edges of the two slots 145 and 146 come to rest on the pins 140 and 141. Thus the pin 141 is exposed and on the rearward stroke, to the left in Figure 1, of the form member the hook 150 on the lever 149 will catch the lower pin 141 and pull the tripping lever into tripping position to the left, the same as if it had been moved by hand. The automatic tripping means herein causes the trip latch 142 to be knocked off or pushed off the pins 140 and 141 to permit the hook lever 149 to engage and operate the tripping lever when the suction nozzles fail to pick up a sheet.

Referring to Figures 3 to 6, the aforesaid tube 30 located above the paper box in the fixed brackets 31, 32, has within it a second tube or hollow shaft 152, which at its one end adjacent the bracket 32 carries a handle 153. Below the shaft 152 the handle has a hook 154. The bracket 32 has secured thereto a fixed bearing 155 and on the latter there is pivoted at 156 a bell crank lever having its two branches or arms in two different planes. One arm 157 extends in under the handle 153 and is formed with a stop notch 158. The other arm extends outside of the feed table, see Figure 14, and downwardly and carries a pin 160. The bell crank 157—159 is held in normal inactive position as shown in Figure 1 by a spring 161 which holds the arm 157 up against a pin 162 on the aforesaid bearing 155, and which spring therefore also holds the pin 160 in the arm 159 against or in touch with the handle 143 of the trip latch 142, Fig. 1.

The bell crank arm 159 is connected by a link 163 to an upstanding arm 164 having a hook 165. The arm is pivoted on the shaft 67. On the nozzle carriage arm 76 there is pivoted on rod 78 a trip cylinder 166 which is a very small cylinder having a piston, not shown, to which is secured a piston stem 167. The latter is pivoted at 168 to a trip catch lever 169 pivoted at 170 to the arm 76. The trip catch lever and the piston stem 167 are held in normal downward position on a stop pin 171 by means of a spring 172 which acts against a pin 173 in the trip catch lever. The catch lever has a hook 174 adapted to engage the aforesaid hook 165. To the said shaft 67 and adjacent the said arm 164 there is affixed a cam 175 which lies in the path of the pin 173 which moves with the nozzle carriage arm 76.

Coiled around the said tube or shaft 152, Figure 4, is a spring 176 which engages the handle 153, Figure 5, and tends to turn said handle and shaft in a clockwise direction in Figures 3 and 5, and thus keeps the handle hook 154 in engagement with the stop notch end 158 of the bell crank arm 157. A pin 177, Fig. 5, limits the movement of the handle 153.

Referring now to Figures 7, 14 and 15 it will be seen that on the opposite end of the hollow shaft 152 there is secured and arm 180 which has a pin 181 adapted to engage the valve bell crank 119.

The operation of the automatic tripping means is as follows:—Referring to Figure 3 it will be seen that during the normal operation, as the nozzle carriage swings from the paper to the platen, the hook 174 on the trip catch lever would engage the hook 165 on the upstanding arm 164, move the latter to the left and through the link 163 operate the bell crank 157—159 to actuate the trip latch and trip the press.

However, this does not occur, because when the suction is applied to the nozzles, it is also applied to the trip cylinder 166 through a hose 183 connecting the cylinder to the hollow rod 77, Figure 3, hence the piston and piston stem 167 is pulled up and the hook 174 is moved upwards out of the way of the hook 165, and of course the latter and the arm 164 do not move, hence the press is not tripped.

When, on the other hand, the suction nozzles fail to pick up a sheet, there is of course no vacuum created in the pipe system between the pump 106 and the nozzles and the trip cylinder 166, consequently, the piston stem 167 is not lifted, the trip catch lever 169 is not lifted and as the nozzle carriage swings to the left in Figure 3 towards the platen, the hook 174 engages the hook 165, and moves the latter to the left with the arm 164. Consequently the link 163 operates the bell crank 157—159 and the pin 160 pushes the trip latch off its pins and the hook lever 149 engages the lower pin 141 and trip the press.

At the same time, however, the bell crank arm 159 is moved rearward as aforesaid, the bell crank arm 157 is moved down as shown in Figure 5 until the stop notch end 158 rests on the pin 162. Thus the spring 176 is free to move the handle 153 in over the arm 157 as shown. That is to say, when the automatic trip operates, the handle 153 and hollow shaft 152 are automatically rocked or moved so that at the other end of said shaft, the pin 181 may operate the valve arm 119 to permanently open the valve 118. As the nozzle carriage continues its rearward movement, the pin 173 rides up or over and on the fixed cam 175 to lift the hook 174 off from the other hook 165, see Figure 6.

To sum up:—When the nozzles fail to pick up a sheet, the trip catch lever 169 remains in its downward position, the two hooks 174 and 165 engage momentarily, long enough to operate the bell crank 157—159. The latter then causes the trip to be operated and also causes the vacuum to be permanently broken by opening valve 118 so long as the tripped condition is permitted to continue.

If such tripped condition is permitted to continue, the press will of course continue to operate, but the nozzles will not pick up any sheets, and as the nozzle carriage swings back and forth, the two hooks 174 and 165 will each time momentarily engage but nothing further will happen. After the trouble has been attended to, the handle 153 is manually moved rearward, that is, the handle hook 154 is moved back to the position shown in Figure 3, and the bell crank 157—159 will immediately be moved up into normal position as in Figure 3 by the spring 161 and the parts are again in normal working positions. The operator then of course moves the tripping lever 14 back into normal untripped position and at the same time with his hand raises the trip latch back upon the pins 140 and 141.

In connection with the tripping mechanism is should also be noted that while the press is tripped, the hook lever 149 continues to slide back and forth on the cam 144 but causes no further movement of the tripping lever 14 having already moved it into tripping position. Also, of course, that when the handle 153 is operated to reset the tripping means, the pin 181 is moved away from the valve lever 119 and the valve 118 is closed by its spring. The tripping mechanism is then ready to operate should for any reason the nozzle again fail to pick up a sheet.

In conveying the sheet from the feed table to the transfer table as in Figure 9, the body of the sheet is supported and prevented from falling by a sheet supporting lip 185 which is conveniently secured to the aforesaid shafts 67. The sheet is then deposited on the platen and printed. After printing the sheet is seized by the delivery gripper which is constructed and operated as follows:—

Referring first to Figures 17 and 18 there is suitably supported under the feed table 18 two rods 190, 190. The gripper carriage 191 slides on said rods which thus serve to support the gripper mechanism. The gripper carriage slides on the rods 190 by means of a suitable guiding support 192. The latter carries a latch 193 adapted to engage a sliding bearing 194 which moves on a rod 195 fast to the frame 19. The sliding bearing has a recess 196 and sloping approaches or cams 197, 197. The bearing also has a depending guide way 198, Figure 18.

In the guide way 198 moves a roller 200 on the end of an arm 201. The arm is fast to a rock shaft 202, see Figure 1, and the rock shaft 202 is operated by means of a short arm 203 and a link 204 connected at 205 to a slotted cam 206 actuated by a stud 207 which connects the connecting rod 9 to the platen locking cam 11. The cam 206 is suitably pivoted to the frame 20 at 208, all as shown in Figure 1.

It follows that irrespective of the position of the gripper carriage with relation to the bearing 194, when the latter commences to move, it will move in under the guiding support 192. The latch on the latter will be gently lifted by one of the sloping cams 197 and drop into the recess 196 thus effecting re-engagement between the gripper carriage and its operating means, the bearing 194.

The feature of detachably connecting the gripper carriage with the operating bearing is necessary when it is remembered that at times the gripper carriage is lifted away from the frame when the feeder is lifted preparatory to swinging it away as described. During the operation of the press and while the feeder is swung away, the bearing 194 will be reciprocated on its rod 195 by the instrumentalities described, and it may or may not be in the exact position under the support 192 when the feed table is again moved into position. The aforesaid means, however, insure automatic exact re-engagement of the gripper carriage and its operating means.

When the feed table is swung away, the gripper carriage is drawn forward in under the table to bring the gripper mechanism out of harm's way. This is accomplished by a catch 210 which slides on a rod 211 on the feed table. The catch is connected by a cable 212 to the lever 25, Fig. 7. When the lever is swung down to raise the table, the catch is pulled back and engages the support 192 whereby the latter and the gripping mechanism are moved to the forward edge of the feed table.

The arrangements and operation of the gripper carriage and associated parts have been described very briefly because they are fully disclosed in the Patent Number 1,476,829 aforesaid, except that the operating elements between the bearing 194 and the cam 206 are new. The curvature of the cam 206 is arranged to give an easy motion to the gripper carriage as it moves toward the platen, but a quick take away movement immediately after the gripper has seized the paper. And at the end of the rearward movement there is a perceptibly slowing down so that when the gripper is opened, the paper is easily ejected from the gripper jaws. The ejecting means will be explained in connection with the gripper.

We come now to a description of the gripper itself, which is believed to be broadly novel in its construction and operation. See Figures 21 to 25 inclusive. To the gripper carriage 191 there is adjustably secured a gripper bracket by means of a wing bolt 215. The gripper bracket, Figure 25, comprises a base 216 having upstanding guiding fingers 217 and 218 whereby the bracket is guided on the carriage. The bracket further has an extension guide 219 to the rear and to one side, and in said guide moves a slide 220 having an adjustable head 221 in the form of a screw. By adjusting the screw the slide may be lengthened or shortened. The slide is pivoted at 223 to a bell crank 224, which in turn is pivoted at 225 to an arm extending out from the guide 219. The bell crank 224 has at one end an upstanding gripper locking finger 226. A spring 227 attached to the bell crank and the gripper bracket tends to pull the bell crank into gripper locking position when the gripper is open as shown in Figure 25, and in turn tends to move the slide 220 outward from the guide 219 to the rear of the gripper carriage or to the left in Figures 21–25. The slide and bell crank pivot 223 are limited in their movements by stops 228 formed by cutting the guide away at that point.

The gripper itself comprises an upper and a lower jaw and a sheet ejector and opener. The lower jaw 230 is a long flat piece ending rearwardly in a knife edge 231. Throughout its length the jaw is slotted as at 232. It also carries two upstanding guide pins 233. At its forward end, to the right in the drawing, the lower jaw carries a bearing 234, and to the latter there is pivoted at 235 a bell crank 236. The bell crank carries an opener roller 237 and is connected at 238 to a gripper opener and sheet ejector 239 in the form of a thin vertically disposed slide which moves in the lower jaw slot 232. The slide 239 is bent as at 240 to conform to the shape of the lower jaw, and intermediate its ends, the slide is formed with a gripper opening cam 240.

An upper gripper jaw 241 is pivoted to the bearing 234 at 242. The upper jaw lies on top of the lower jaw and like the latter ends in a knife edge 243. The upper jaw is also slotted throughout its length as at 244 and is provided with an aperture or open slot 245. On the one side the upper jaw is obliquely undercut as at 246. The jaw also has two holes through which the pins 233 project. 247 is a spring carried by a stud 248 secured in the lower jaw. 249 is a spring which tends to move the roller 237 upwards.

As shown in the drawing, the upper and lower jaws occupy the spaces between the fingers 217 and 218. The ejector and opener slide 239 lies between the two jaws with its cam 240 projecting upwards through the open slot 245. The opener is held in retracted position as in Figure 21 by the spring 249 tending to swing the bell crank 236 upwards. The spring 247 in Figure 21 tends to close the upper jaw upon the lower one, but this is prevented by the locking finger 226 which takes in under the cut away portion 246 on the upper jaw. It will here be noted that the locking finger holds the upper jaw locked in open position irrespective of the position of the gripper on the gripper bracket, because the under face of the cut away 246 is parallel to the lower jaw, hence the opening of the jaws is fixed.

During the operation of the press the gripper is moved in open position towards the platen, and the lower jaw passes under the printed sheet thereon. When the gripper reaches the platen, the head 221 of the slide 220 hits the platen with a sharp blow. This forces the slide back and throws out the bell crank 224 as seen in Figure 23. Hence there is no longer any resistance to the spring 247 which promptly closes the gripper to seize the printed sheet. The positions of the parts as closed is shown in Figures 22 and 23. The grippers next move to the right or forward with the printed sheet until the roller 237 comes in contact with and passes under a gripper opening cam 250, see Figure 17. This depresses the roller 237 and through the bell crank 236 the opener 239 is forced to the left in the drawing, when the cam 240 will lift the upper jaw. Then the locking finger 226 will snap in under the cut away face 246 and the grippers will remain open. But when the opening slide 239 moves to the left, it at the same time necessarily pushes the sheet out of the grippers because said slide lies partly below the paper in the groove 232, hence the end of the slide is squarely across the edge of the paper, and the sheet is properly delivered under the feed table. The ejector is of advantage because the quick take away movement of the paper from the platen necessarily imparts a forward flying momentum to the paper which tends to keep the paper firmly in the gripper. The ejector positively frees the paper from the gripper jaws. The gripper now being open and held open by the locking finger 226, it moves rearward ready to seize the next printed sheet.

In connection with operating the grippers the following should be noted. The cam 206, Figure 1, is so designed, that it gives a quick initial movement to the delivery stroke of the grippers with a slight dwell at the end of the stroke so that the ejector slide may have time to eject the paper from the gripper. Also it will be noted that the entire operation is automatic. The grippers are closed by contact with the platen as in Figures 22 and 23, and are opened by the operation (depression) of the roller 237 as in Figure 24. The grippers are held positively in open position by the locking finger 226 and in the closing position by the spring 247. The opening moment is controlled by adjusting the cam 250 by a screw and slot connection. The closing moment is controlled by adjusting the slide screw 221.

In connection with the delivery grippers— one or more may be used—and the tripping mechanism, means are provided for tripping the press should the delivery gripper fail to seize a sheet. To this end there is pivoted in slots in the upper gripper jaw at 252 two trip dogs 253, 253. Each dog has a weighted head 254 and a tail 255. When the gripper is open, Figure 21, the trip dogs hang as shown by gravity resting on a pin 256. When the grippers close, Figure 22, the dogs are thrown upwards and become inactive. That is, when the grippers seize a sheet as in Figure 22, the dog tails are lowered. If they do not seize a sheet the dog tails will be automatically elevated as in Figure 21 the moment the grippers leave the platen, see Figure 3. This slight oscillatory movement of the trip dogs is utilized to actuate the tripping mechanism whenever necessary.

Between the paper pile and the platen there is hung a gripper trip 260 which is a thin piece of metal extending across the feeder, see Figures 1, 3, 4, 9 and 14. The trip 260 is fast on a shaft 261. At one end, on the tripping side of the press, the shaft 261 carries an upstanding arm 262, which is connected by a link 263 to a hooked arm 264 pivoted on the aforesaid bearing piece 155, see Figures 3 and 5. The arm 264 normally hooks in over a pin 265 fast on a finger 266 carried by a shaft 267 which lies inside the aforesaid hollow shaft 152 within the tube 30. The shaft 267 also carries a handle 268. On the other end of the shaft there is secured an arm 269 having a pin 270, Fig. 15. The pin 265 is held in under the hooked arm 264 by a spring 271, Figure 3.

The operation is as follows:—If the grippers seize a sheet as in Figure 9, the trip dog tails 255 will remain lowered and on the delivery stroke pass under the gripper trip 260 without touching it. If the grippers fail to seize a sheet as in Figure 3, the tails 255 will be raised and on the delivery stroke strike the trip 260 passing thereunder. Consequently, the shaft 261 will be rocked slightly and through the link 263 the hook arm 264 will be moved away from the pin 265, wherefore the shaft 267 will be rotated slightly by the spring 271. This movement is sufficient to cause the pin 270 on the other end of the shaft to open valve 118 in the valve chest. This of course breaks the vacuum in the suction nozzles, and this condition having been brought about, the press will be tripped as described in connection with the tripping mechanism above. The resetting is accomplished by moving both handles 268 and 153 back into original normal position. The reason for this indirect way of operating the tripping mechanism when the grippers fail to deliver is, that it is impractical to construct the gripper trip device strong enough to pull directly on the tripping means at 159 to knock the trip latch off the tripping lever 14. It should also be borne in mind that the tripping mechanism on a job press is a delicate device, which nevertheless must be arranged and constructed to act instantly whenever troubles occur requiring tripping. The objects have been accomplished by the aforesaid tripping means.

Figure 13 illustrates a modified form of suction nozzle 290 the under surface 291 of which is curved in a direction at right angles to the leading edge of the sheet. This is of particular advantage in separating heavy stock by producing an upward curve at the edge and cause a sliding movement of the top sheet with relation to the next sheet.

One of the most important features of this invention resides in the manner in which the feeder is attached to and operated from the press. The art knows numerous automatic feeders for platen presses, but they usually require that the frame of the press be drilled for attaching numerous brackets, connections and other parts in order to synchronize and operate the feeder. By referring to Figure 1, it will be seen that the gripper and the trip are operated by attaching the hook arm 149 to the end of the shaft 130 and providing a suitable stud on the end of the connecting rod 9. And on the right side of the press as shown in Figure 7, only a suitable stud or bolt at 99 is required to connect the feeder. The lifting levers at 70 and 69 require a very small bearing on the platen rock shaft. It will therefore be clear, that this feeder may be assembled as a unit on the frames 19 and 20, and then connected to the press very easily and quickly.

There are no heavy parts in the feeder to be operated by the press and increase the load. It will further have been observed that all the parts are very accessible and may be adjusted quickly and conveniently.

The invention has been disclosed in its preferred form, but it is to be understood that nothing hereinbefore stated is to be construed as a limitation, because changes and alterations may easily be made by those skilled in the art without departing from the spirit of the invention or the scope of the appended claims.

We claim:—

1. An automatic feeder for platen presses comprising a table for supporting the paper to be printed, paper separating means pivoted on said table and mechanism on said table for operating said separating means to convey the separated paper to the platen of the press.

2. An automatic feeder for platen presses comprising a table for supporting the paper to be printed, paper separating suction means pivoted on said table and mechanism on said table for operating said separating suction means to convey the separated paper to the platen of the press.

3. An automatic feeder for platen presses comprising a table for supporting the paper to be printed, an oscillating carriage mounted on said table, paper separating means pivoted on said carriage, means on the latter for adjusting the movement of said paper separating means, mechanism for operating said separating means, and means for operating said carriage to cause said separating means to convey separated paper to the platen of the press.

4. An automatic feeder for platen presses comprising paper supporting means, an oscillating carriage mounted thereon, paper separating means mounted on said carriage, means for operating said paper separating means to separate a sheet of paper, means on said carriage for adjusting the movement of the said separating means, cooperating means on said carriage and table for regulating the movement of the carriage and means for operating the latter.

5. Paper separating means comprising a support for the paper, a carriage mounted on said support and adapted to swing in over the paper to separate the same to a position away from said support, means on the latter for regulating the movement of said carriage, means on said carriage for separating the paper, means on said carriage for adjusting the operation of the separating means and mechanism for operating the said carriage.

6. Paper separating means comprising a support for the paper, a pair of arms extending upwards from said support and pivoted thereto at their lower ends, a pair of separating suction nozzles, means for pivoting the latter near the upper ends of said arms, and means for operating the latter to cause said suction nozzles to swing from a paper separating and pick up position in over said support to a position outside the support for conveying separated paper away from the latter.

7. Paper separating means comprising a paper supporting table, a pair of arms projecting upwards therefrom and pivoted to said table at their lower ends, said arms having a fixed throw from a given position in over said table to another given position outside the same, connections between the upper ends of said arms, paper separating suction nozzles, pivoted on said connections, means on the latter for regulating the movement of said nozzles and means for operating the said arms.

8. The combination of paper supporting means, a shaft mounted thereon, a nozzle carriage pivoted on said shaft and extending upwards from said supporting means, paper separating suction nozzles pivoted on said carriage, means for swinging the latter from a position in over said supporting means to a position away therefrom, means for causing said suction nozzles to swing on said carriage in a like manner, means for regulating the swing of said suction nozzles and means for applying suction to the said suction nozzles.

9. Paper separating and conveying means comprising a paper supporting table, means for positioning the paper thereon, paper separating suction nozzles, means for swinging the latter from a paper separating position in over said table to a paper delivery position away therefrom, all of the aforesaid means being carried by the said paper supporting table and means for applying suction to the said suction nozzles.

10. A suction nozzle of the character described comprising a pivoted support, a member slidably mounted thereon, a spring interposed between said support and member to force them apart, a suction cup carried by said slidably mounted member and a spring for keeping the latter in position on said support and for tilting the said suction cup at predetermined intervals.

11. The combination of a paper supporting table, means for positioning paper thereon, said means including a pair of corner stops each corner stop comprising a paper edge registering member and an inclined lip member secured thereto and adapted to lie in over the edges of the paper for preventing disarrangement of the paper substantially as described.

12. An automatic feeder for platen presses comprising a pair of pivoted arms, a shaft connecting the same, suction nozzles secured to said shaft between said arms, means for oscillating the latter to swing the suction nozzles therebetween from a paper pick up position to a delivery position, adjustable means between said arms for limiting the movement of said nozzles in one direction, adjustable means adjacent one of said arms for limiting the movement of said nozzles in the opposite direction, and means for applying suction to the said nozzles.

13. An automatic feeder for platen presses comprising a pair of pivoted arms, a shaft connecting the same, suction nozzles secured to said shaft, means for oscillating said arms, connections pivoted to one of said arms and the said shaft for automatically operating the said suction nozzles when the said arms are being oscillated, means for adjusting the operations of the suction nozzles and means for applying suction thereto.

14. An automatic feeder for platen presses comprising a pair of pivoted arms, a shaft connecting the same, suction nozzles secured to said shaft, means for operating said shaft to swing the said nozzles from a paper pick up position to a delivery position above said platen, means carried by said arms for limiting the swing of said suction nozzles in one direction and other means for limiting the operation of the said operating means to limit the swing of the suction nozzles in the opposite direction.

15. In a device of the character described, a suction nozzle, means for moving the same from a paper pick up position to a delivery position, a pump, an air pipe between said pump and nozzle, a valve in said air pipe, means in the valve for automatically opening the air pipe for the passage of air from the nozzle to the pump on the suction stroke of the latter, said means also serving to close the said air pipe to the nozzle on the compression stroke of the pump, means for operating the said nozzle moving means and mechanism actuated by said operating means for opening the said valve when the nozzle has reached its delivery position as aforesaid.

16. In a platen press, a platen, a movable form member, a paper feed table mounted on said press in front of the platen, a paper separating mechanism mounted on said paper feed table adjacent the platen, devices for operating said paper separating mechanism to separate a sheet of paper on the feed table and convey it to the platen and means actuated from said form member for operating said operating devices.

17. In a paper feeding device the combination of suction nozzles for separating and conveying the paper, a nozzle for directing a blast of air towards the paper to be separated, a pump for operating said nozzles, connections between the latter and the said pump and an automatic valve for controlling the admission and withdrawal of air from the said nozzles as and for the purpose set forth.

18. A gripper of the character described comprising a base, a pair of gripper jaws thereon, means on said gripper base for closing the gripper by contact with another element, means on said gripper for opening the same, said opening means being actuated by contact with still another element and paper ejecting means carried by said gripper opening means.

19. The combination of a platen printing press, of a paper feed table pivoted on said press adapted to be swung into or out of operative position with respect to said press, paper separating and conveying nozzles pivoted on said paper feed table, mechanism for operating said nozzles, said mechanism having a detachable element whereby to interrupt said mechanism when the said table is swung away as aforesaid.

20. A sheet feeding device for platen printing presses comprising a frame attached to the press in movable relation thereto, a paper transfer table, paper separating and conveying nozzles, a shaft for supporting said transfer table and the said nozzles on the said frame and means for raising and lowering the transfer table and means for swinging said nozzles from a paper pick up position in over said frame to a paper delivery position in over said transfer table.

21. Paper separating means comprising a support for the paper, a pair of arms pivoted to said support at their lower ends, a shaft connecting the upper ends of said arms, paper separating suction nozzles suspended from said shaft, means for swinging the latter from a position in over said paper support to a position away therefrom and means for automatically causing said nozzles to swing in a like manner on the said shaft between the said arms.

22. Paper separating and conveying means for platen presses comprising paper supporting means, paper separating means, supporting members therefor, mechanism for swinging said supporting members in a concave arc from a position in over said paper supporting means to a position in over the platen of the press and simultaneously therewith swinging the said paper separating means in a substantially convex arc to a position in over the platen and means supported on said paper supporting means for operating the said swinging mechanism.

23. A gripping mechanism of the character described comprising a gripper base, an upper and a lower cooperating gripper jaw adjustably supported on said base, a member for engaging said upper jaw to open the same, a locking member for locking the upper jaw in open position irrespective of the adjusted position of the jaws, means on said base for disengaging the said locking member from the upper jaw, means on the latter for closing the upper jaw, said means being automatically operable upon the disengagement of the said locking member.

24. A gripper of the character described comprising a base, a pair of gripper jaws thereon and adapted to be opened and closed, a member on said base for maintaining the gripper in open position, means on said base for disengaging said member from the gripper to permit the same to close, means for automatically closing the gripper upon the operation of the said disengaging means, a gripper opening member and means for operating the same.

25. A gripper of the character described comprising a base, a pair of gripper jaws adjustably mounted thereon and adapted to be opened and closed, a member on said base for maintaining the gripper in open position irrespective of the adjusted position thereof, means for disengaging said member from the gripper to permit the same to close, means for automatically closing the gripper upon the operation of the said disengaging means, a gripper opening member and means for operating the same.

26. A gripper of the character described comprising a base, a pair of gripper jaws thereon, a member on said base for maintaining the gripper in open position, means on said base for disengaging said member from the gripper, means, automatically operable upon the disengagement of the said member, for closing the gripper, means for opening said gripper and other means for causing the said member to automatically re-engage the gripper to maintain the same in open position.

27. A gripper of the character described comprising a base, a pair of gripper jaws thereon, a member on said base for maintaining the gripper in open position, means on said base for disengaging said member from the gripper, means, automatically operable upon the disengagement of the said member, for closing the gripper, means, including a paper ejecting member, for opening said gripper and other means for causing the said member to automatically re-engage the gripper to maintain the same in open position.

28. A gripping mechanism comprising a slidably operated gripper carriage, a gripper base supported thereon, means for closing said gripper, means, including a paper ejecting element, for opening said gripper, a member for locking said gripper in open position, and means for disengaging said member from the gripper to permit the said closing means to operate.

AMOS ACKLEY.
S. HAINES PLUM, 2D.